Feb. 26, 1935.    R. STEENECK    1,992,401
DISPLAY DEVICE
Filed June 15, 1933    3 Sheets-Sheet 1
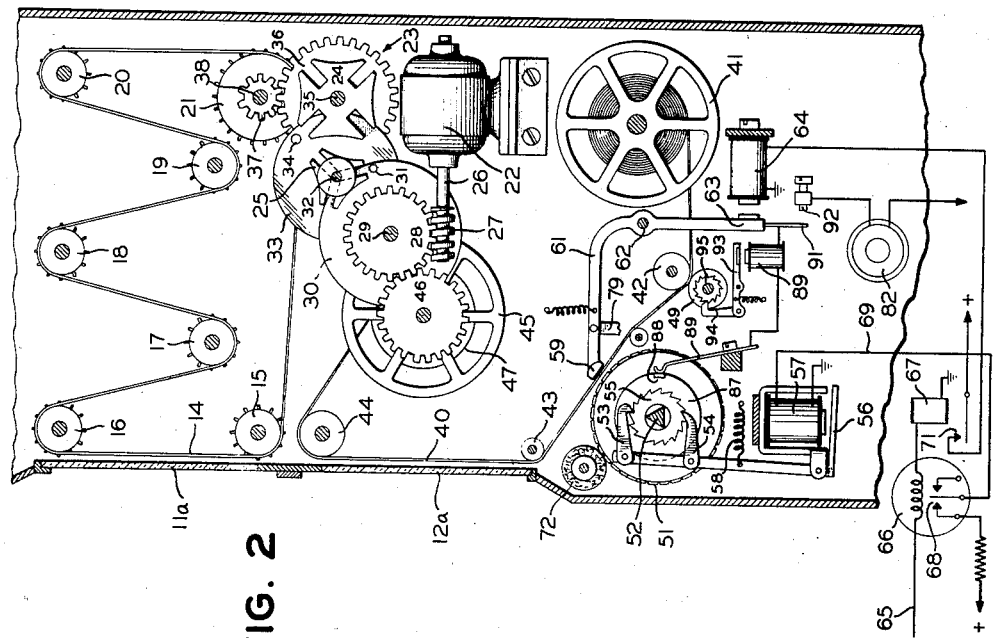
FIG. 2
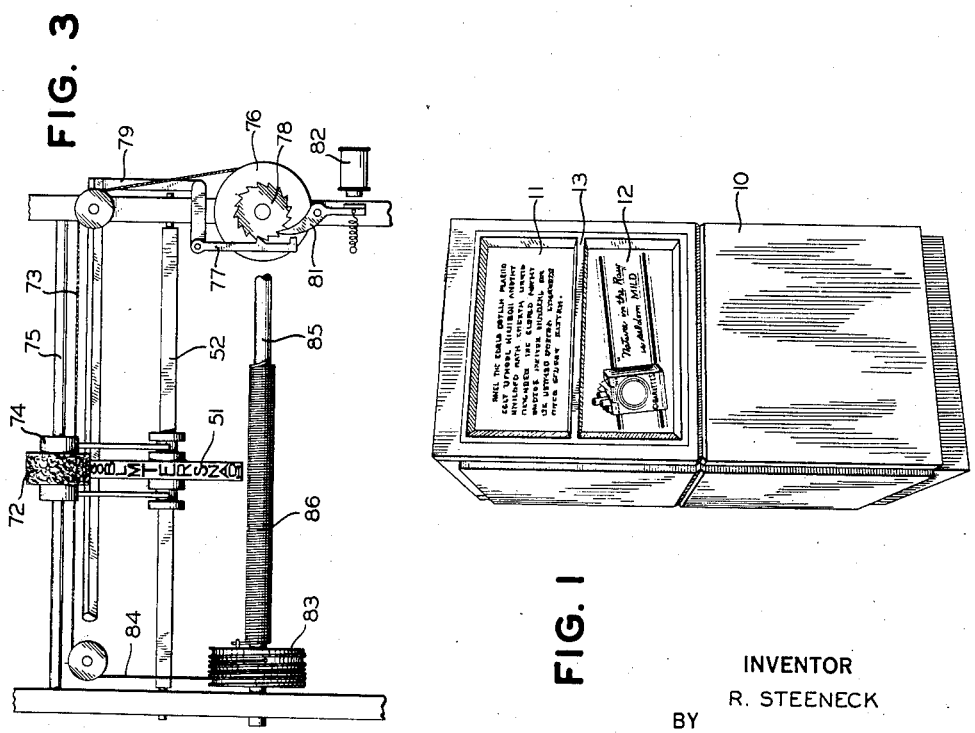
FIG. 3
FIG. 1
INVENTOR
R. STEENECK
BY
Eugene C. Brown
ATTORNEY

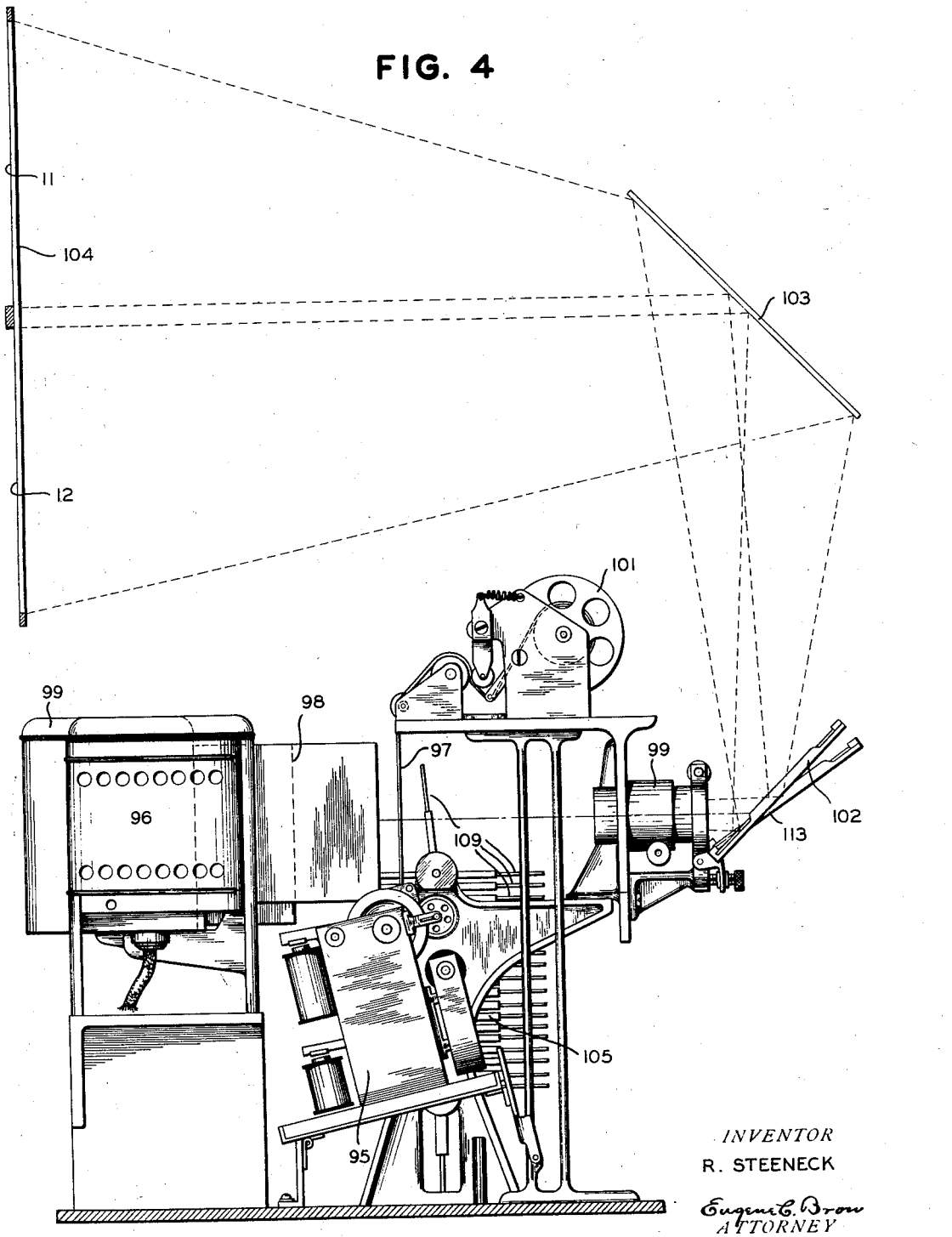

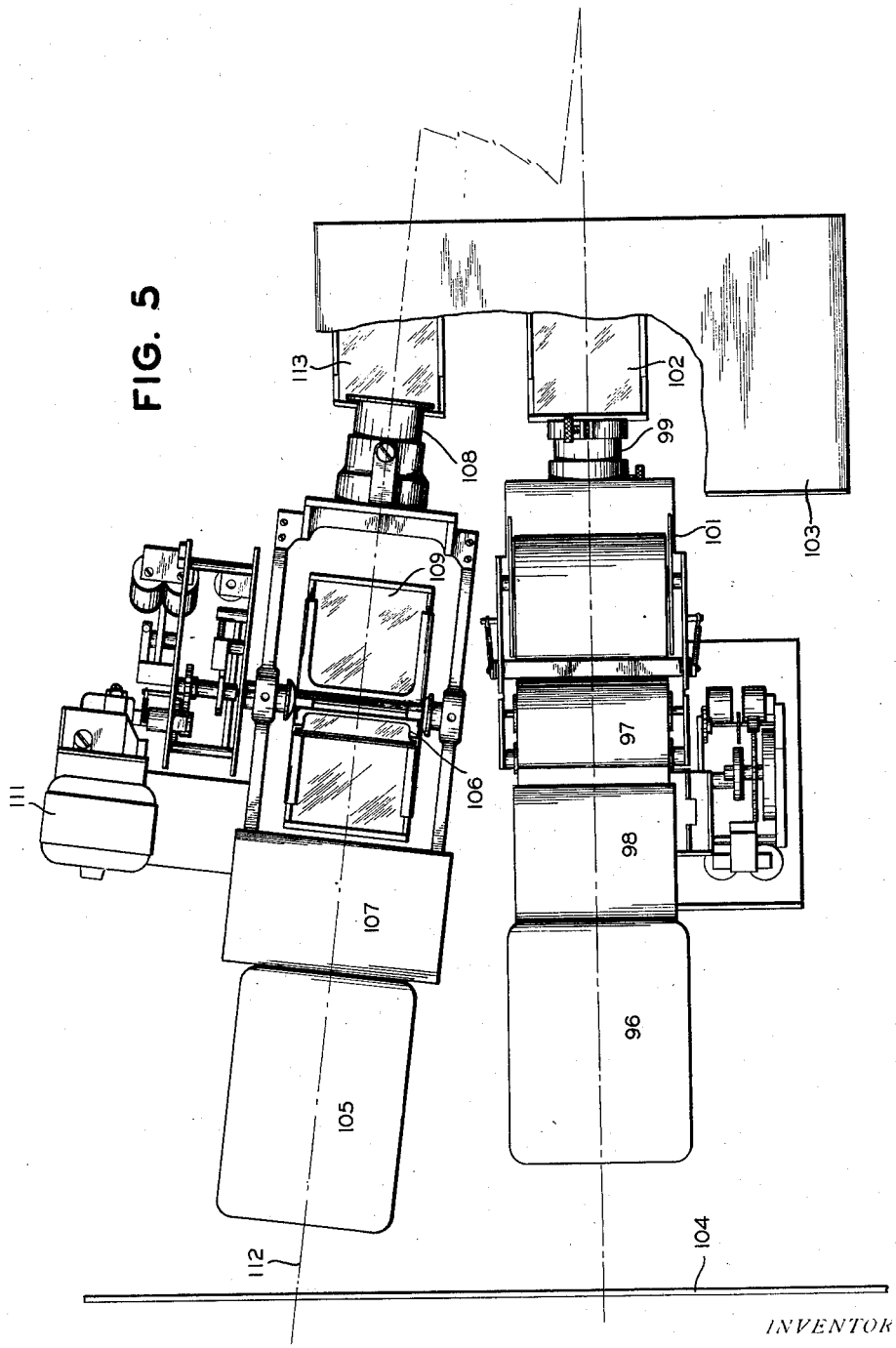

Patented Feb. 26, 1935

1,992,401

UNITED STATES PATENT OFFICE 1,992,401

DISPLAY DEVICE

Robert Steeneck, New York, N. Y., assignor to The Western Union Telegraph Company, New York, N. Y., a corporation of New York Application June 15, 1933, Serial No. 676,018

6 Claims. (Cl. 88—24)

This invention relates to a display device and more particularly to a combined advertising and news displaying mechanism.

One of the objects of the invention is to enhance the presentation of advertising matter by combining with it presentation current news items or similar matter of general interest.

Another object is to present the news and advertising matter in such relation that attention to the display will be attracted by the news but will not be monopolized thereby to the detriment of the advertising matter.

Another object is to arrange the news and advertising display mechanism in such a position that attention to one compels notice of the other.

Another object is to provide a display of this nature which is attractive, informative and unique.

A still further object is to produce an advertising medium in which the attention attracting features change continuously or intermittently.

Other objects and advantages of the invention will hereinafter appear.

In accordance with this invention an advertising display is provided which may comprise a number of advertising units arranged to be brought into view successively and in conjunction therewith and in order to direct attention to the advertising units I present a continuous news display, the news and advertising displays being arranged in such relation that attention attracted to the former will be shared by the latter. The news items are preferably, but not necessarily, supplied over a telegraph circuit from a central news bureau and recorded on telegraph printers at the display point. The news printer may be part of an extensive news distributing net work by means of which the news is broadcast by a common transmitter to a number of display units distributed throughout a given territory.

The printing is preferably recorded on a page or web and the printed record passed line by line into display position. The recording of the news items proceeds at a somewhat slower rate than the normal reading time thereof, so as not to monopolize the reader's attention, each advertising unit displayed therewith remaining in display position for a sufficient period to enable the idea conveyed thereby to be obtained by the observer in the differential between the recording and normal reading time of the news items.

The advertising units may comprise separate cards displayed successively, an endless apron carrying advertising material intermittently fed past the display position, or an image projected from slides.

The news is recorded by a telegraph printer located at the display point and the printed web thereof or an image produced therefrom is passed, line-by-line, through a display position closely adjacent to the advertising display.

In order that the invention may be more fully understood reference will be had to the accompanying drawings, in which Figure 1 is a prospective view of a display cabinet showing the location of the news and advertising displays;

Figure 2 is a sectional view of the cabinet showing one form of display controlling mechanism;

Figure 3 is a detail of the printing mechanism shown in Figure 2;

Figure 4 is a side elevation of a modified form of news and advertising display mechanism; and Figure 5 is a plan view of the apparatus shown in Figure 4.

Referring first to Figure 1, a cabinet 10 is shown having in its upper front face two windows or display areas 11 and 12, disposed one above the other and separated only by a narrow partition 13. The news items are displayed in the upper window 11 and the advertising units are displayed in the lower window 12. While the windows are shown disposed one above the other, they are not limited to such relative positions but may be arranged side by side or in any other manner in which they may be observed substantially simultaneously. The arrangement shown, however, provides convenient spaces for displaying the respective services and is preferred since the eye naturally lowers to the advertising display following the reading of the last line of printed matter.

The individual news items in news services now in use are relatively short, normally occupying not more than five or six lines and the upper window 11 is preferably of sufficient height to permit a complete item of this length to be displayed at one time. As successive lines of the item are printed they pass upwardly into display position.

In Figure 3 an optical display arrangement is shown in which the windows 11 and 12 are disposed as shown in Figure 1 and in Figure 2 I have shown the news and advertising display spaces reversed with the advertising matter displayed above the news items. This latter figure will be described first.

Referring now to Figure 2, disposed behind the upper window 11a is an endless belt or apron 14, passing around a number of idler sprockets 15 to 20 and a driving sprocket 21. The belt 14 carries a number of individual advertising units, each of which is of sufficient size to fill the window 11a. The belt is intermittently fed through mechanism, to be described, so as to bring each advertising unit in succession into the window and to retain the same in position for a predetermined period.

The feeding mechanism for the belt is driven by a continuously running motor 22 and intermittent motion mechanism, generally indicated at 23, comprising a four arm Geneva wheel 24 and a three arm Geneva wheel 25. The motor shaft 26 has a worm 27, meshing with a gear 28, mounted on a shaft 29. The shaft 29 carries a pin wheel 30, which revolves in the direction indicated by the arrow thereon. The pin 31 on wheel 30 engages one of the slots of the Geneva wheel 25 each revolution, so as to rotate the same through a revolution for each three revolutions of the wheel 30. Secured to the shaft 32 of the Geneva wheel 25 is a second pin wheel 33, the pin 34 of which engages the slots of the Geneva wheel 24 so as to rotate the same through a quarter of a revolution. Secured to the Geneva wheel 24 through the shaft 35 is a gear 36, meshing with a gear 37, mounted on the shaft 38 of the driving ratchet 21. With the motor 22 operating continuously, it is apparent that the ratchet wheel 21 will be turned at predetermined periods, the extent of movement thereof being just sufficient to bring a new advertising unit on the belt 14 in position in the window 11a. The arrangements of gears and Geneva wheels is such that this movement will be comparatively rapid, taking place in the time of rotation of the pin wheel 30 through a small arc and occurring once for every three revolutions of the wheel 30. It is obvious, of course, that other mechanism for providing this intermittent and comparatively rapid motion may be employed in the place of that shown.

Disposed below the apparatus just described is a printing mechanism for producing a record upon a web 40 of paper of a width equal to that of the lower window 12a. The web 40 is drawn from a supply reel 41 over rollers 42, 43 and 44 and is rewound upon a take-up reel 45 also driven by the motor 22 through a gear 46, meshing with the gear 28 and a friction clutch 47 intermediate the gear 46 and the reel 45. The paper is normally restrained from movement by a snubbing roller 49 engaging the roller 42. With the motor 22 running continuously, it will be apparent that whenever the snubbing roller 49 is rotated to draw paper from the reel 41 it will be taken up on the reel 45.

The printing mechanism, shown by way of example only, comprises a type wheel 51 mounted upon a triangular shaft 52 to rotate therewith and sliding longitudinally thereon so as to pass from one margin of the paper to the other. The type wheel is brought into printing position by a pair of pawls 53 and 54 engaging a ratchet wheel 55 at one end of the shaft 52. The pawls are actuated by the armature 56 of an electromagnet 57 and serve, on energization of the magnet, to rotate the type wheel one character and upon de-energization to rotate it a succeeding character through the force exerted by the spring 58.

Printing is effected by a platen 59 disposed at the back of the web. The platen is carried by a lever arm 61 pivoted at 62 and having a downwardly extending armature 63 arranged to be actuated by the press magnet 64.

The printing is controlled by telegraph signals received over a line 65, which terminates in a polar relay 66 and a neutral relay 67 in series. The signals for operating the printer comprise a series of current reversals that serve to step the type wheel around from its last printing position into the desired position and a prolonged impulse of either polarity following such current reversals for actuating the press magnet 64. The relay 66 responds to the current alternations, causing stepping impulses to be supplied from its contact 68 over a conductor 69 to the magnet 57. The relay 67 does not respond to these current alternations but is actuated whenever the prolonged press impulse is received to close its contacts 71 and complete a circuit to the press magnet 64. When this occurs the platen 59 is thrown against the paper, pressing the same into contact with the type wheel. Ink is applied to the type wheel through an inking roller 72.

As each character is printed in this manner, the type wheel moves transversely of the paper through mechanism shown in Fig. 3, and at the completion of the printing of a line the snubbing roller 49 is released to advance the paper one line space upwardly across the window 12a.

The type wheel 51 is advanced across the paper by a cord 73 secured to a sleeve 74 slidably mounted on a horizontal shaft 75. The cord 73 is wound on a drum 76 pivoted to the frame of the machine and rotated by a pawl 77 engaging a ratchet wheel 78 fixed on the drum. The pawl 77 is actuated by a link 79 from the platen lever 61 so that each time a printing stroke occurs, the pawl is lowered to engage a new tooth of the ratchet wheel, and on the back stroke of the platen the ratchet wheel and drum 76 are rotated to wind the cord 73, thereby drawing the type wheel and ink roller one character space to the right. The ratchet wheel 78 is provided with a holding pawl 81 adapted to be released by the carriage return magnet 82. A second drum 83 is disposed at the opposite side of the printer upon which a second cord 84 is wound. The cord 84 is also secured to the sleeve 74. The drum 83 is loosely mounted upon a shaft 85 and is connected thereto through a spiral spring 86 in such manner that as the type wheel moves to the right, the spring 86 is wound, thereby storing energy for the return movement of the type wheel to the left hand margin of the paper whenever the pawls 81 and 77 of the drum 76 are released.

The mechanism for releasing the snubbing roller 49 to permit a line feed operation comprises a commutator 87 carried by the shaft 52 and having a single live segment 88. A brush 89 engages the commutator and in a predetermined position thereof, corresponding to a blank portion of the type wheel, engages the segment 88, applying ground to the winding of a line feed magnet 89. The circuit for the magnet 89 is completed through a contact tongue 91, carried by the armature 63 and a fixed contact 92 which is connected to a source of potential through the winding of the carriage return magnet 82. Consequently whenever it is desired to advance the paper upwardly, the type wheel is stepped around into position to bring the segment 88 in contact with the brush 89 and a press impulse is supplied to actuate the platen to momentarily close contacts 91 and 92, thereby energizing magnets 89 and 82. The magnet 89 thereupon draws down its pivoted armature 93, advancing the feeding pawl 94 upwardly into a succeeding tooth of the ratchet wheel 95, secured to the shaft of the snubbing roller 49 and as the press circuit is broken, permitting magnet 89 to de-energize, the ratchet wheel 95 and snubbing roller 49 are rotated a sufficient distance to advance the paper one line space. The magnet 82, upon being energized, releases the pawls 81 and 77 permitting the spring 86 to restore the type wheel to its left hand margin.

The construction of the type wheel 51 and its stepping mechanism is fully disclosed in a patent to R. Hoover et al., No. 1,881,585, filed October 11, 1932, and entitled Quotation board printing unit. In place of the mechanism described, if desired, any form of type wheel page printer may be substituted, as for instance that shown in the patent to Burry, No. 962,694, granted June 28, 1910, and entitled Printing telegraph receiver.

In operation current news items, such as political, financial, sports, or other types of information of general interest, are printed on the web in response to signals received over the telegraph line and the web is fed upwardly past the window 12a, line-by-line, so as to provide a continuous changing record of general interest. The web is taken up as each line is released by the motor 22, which at the same time intermittently drives the belt 14 to change the advertising display at predetermined intervals. Due to the positions of the two displays, they are viewed substantially simultaneously and the attention of the public, being attracted by the news items, is at the same time directed to the advertising material. It is inherent in the type of printer shown, or in that of the Burry patent, that the rate of recording is appreciably slower than the time required to read the items and, therefore, during the interval between successive lines the observer will be free to view the advertising display.

While the web 14 carrying the advertising material and the printed web 40 are shown disposed one over the other, it is obvious that they be side by side, or where continuously changing advertising display is desired, the advertising matter may be arranged along one side of the printed web 40.

The cabinet 10 may be of any desired size and by varying the size of the type wheel 51 and the cooperating printing mechanism, printing may be effected in characters commensurate with the area of the display window. However, in case a large display is desired, it is preferable to record upon a web of the size ordinarily employed in printing telegraph systems, which is about five inches in width and to project the printed record upon a translucent screen forming an enclosure for the window 11. In Figures 4 and 5 such an arrangement is shown. The advertising matter may still be displayed by the mechanism shown in Figure 2, but by way of variation the same is shown also projected on to the window 12 by a lantern slide projector.

Referring first to Figure 4, a printer 95 of the Burry type is shown mounted below a projector 96 with the web 97 of the printer passing upwardly through the field of the projector between the condensing lens set 98 and the objective lens 99. The web is re-wound on a take-up reel 101 which may be operated from a continuously running motor through a friction clutch (not shown).

The image produced by the projector is reflected upwardly by a mirror 102 on to the upper half of a second mirror 103 from which the image is reflected on to the rear of the upper half of the translucent screen 104. The projector 96 is disposed with its optical axis in a plane normal to and centrally of the screen 104.

Disposed to one side of the news projector 96 is a second projector 105 having a slide magazine 105 disposed between its condensing lens set 107 and the objective lens 108. The slide magazine comprises an endless carrier having a multitude of slides 109 adapted to be fed one at a time into projecting position. The slide carrier and the paper take-up mechanism may be driven by a common motor through mechanism similar to that shown in Figure 2 or a separate motor 111 may be employed. The construction of the slide carrier is shown in patent of W. L. Patterson, No. 1,352,471, granted September 14, 1920 for Automatic projector. A control mechanism therefore is also shown in a copending application of E. W. Hewitt, Serial No. 659,973 filed March 7, 1933, and entitled Display apparatus. The specific construction of this mechanism forms no part of the present invention.

The optical axis 112 of the projector 105 is disposed at an oblique angle to the medial plane normal to the screen 104 and the image produced thereby is reflected by an individual mirror 113 on to the lower half of the common mirror 103 and thence on to the rear side of the lower portion of the screen 104.

The slides may carry advertising material and they are brought into the field of the projector intermittently to provide a periodically changing advertising display.

Due to the fact that the projector 105 is oblique to the screen the images produced from the slide normally will have a small amount of keystoning or distortion and in order to overcome this distortion, a counter-distortion is produced in the slides by making the slides from photographs taken at an angle equally oblique to the original objects.

The printer 95 is operated over a telegraph circuit in the same manner as the printer shown in Figure 2 but the successive news items are advanced line-by-line across the upper window 11 and the advertising slides projected on to the lower window. Obviously with the projecting system shown there is no limitation as to the size of the windows 11 and 12 excepting the available distance between the projector and the windows.

While two ways of simultaneously displaying news and advertising matter inter-related so one enhances the presentation of the other are shown, it is to be understood that various other means for producing this result will occur to those skilled in the art and therefore the particular details shown and described are to be considered in an illustrative but not a limitative sense.

What is claimed is:

1. A display apparatus comprising a cabinet having a plurality of display areas disposed in juxtaposition, a news printing apparatus contained within said cabinet, means for displaying news items produced by said printing apparatus in one of said areas, an advertising display magazine also disposed within said cabinet and means for displaying said advertising displays in the other area, both of said displays being changeable and so timed as to enable the advertising display to be fully observed in the differential between the normal reading time and the printing time of successive news items.

2. A display apparatus comprising a cabinet having a pair of screens, display apparatus in said cabinet associated with said screens for producing a separate display on each thereof, said display controlling apparatus serving to change periodically the entire display on one screen simultaneously and for progressively changing the display on the other screen, and means for controlling the subject matter of one of said displays from a remote point.

3. A display apparatus comprising a cabinet having a pair of screens, display apparatus in said cabinet associated with said screens for producing a separate display on each thereof, said display controlling apparatus serving to change periodically the entire display on one screen simultaneously and for progressively changing the display on the other screen, said simultaneously changed display comprising a series of prepared units displayed in succession and the progressively changed display comprising a printed record produced telegraphically.

4. A display apparatus comprising a cabinet having a pair of display areas disposed in juxtaposition in one wall thereof, display apparatus in said cabinet associated with said areas for producing separate displays in each area, said display controlling apparatus serving to change periodically the entire display in one area simultaneously and to progressively change the display in the other area, said simultaneously changed display comprising a series of prepared units displayed in succession and the progressively changed display comprising a printed record produced telegraphically.

5. A display apparatus comprising a cabinet having a pair of display areas disposed in juxtaposition in one wall thereof, display apparatus in said cabinet associated with said areas for producing separate displays in each area, said display controlling apparatus serving to change periodically the entire display in one area simultaneously and to progressively change the display in the other area, and means for controlling the subject matter of at least one of said displays from a remote point.

6. In a display apparatus, a cabinet having a screen therein, a plurality of projectors disposed in said cabinet, said projectors being arranged side-by-side on substantially the same level, a reflecting system in said cabinet, said projectors and reflecting system being disposed relative to each other and to the screen so as to produce images on said screen disposed one above the other.

ROBERT STEENECK.